United States Patent
Bargagli Petrucci et al.

(10) Patent No.: US 11,801,620 B2
(45) Date of Patent: Oct. 31, 2023

(54) AUTOMATIC PLANT FOR CLEANING MOLDS FOR TIRES

(71) Applicants: KEYMICAL HOLDING INC., Wilmington, DE (US); Enrico Bargagli Petrucci, Borgo Maggiore (IT); Lorenzo Casesa, Borgo Maggiore (IT)

(72) Inventors: Enrico Bargagli Petrucci, San Pancrazio (IT); Lorenzo Casesa, Borgo Maggiore (IT)

(73) Assignees: KEYMICAL HOLDING INC., Wilmington, DE (US); Enrico Bargagli Petrucci, Borgo Maggiore (IT); Lorenzo Casesa, Borgo Maggiore (IT)

( * ) Notice: Subject to any disclaimer, the term of this patent is extended or adjusted under 35 U.S.C. 154(b) by 279 days.

(21) Appl. No.: 16/957,035

(22) PCT Filed: Dec. 24, 2018

(86) PCT No.: PCT/IB2018/001471
§ 371 (c)(1),
(2) Date: Jun. 22, 2020

(87) PCT Pub. No.: WO2019/130055
PCT Pub. Date: Jul. 4, 2019

(65) Prior Publication Data
US 2020/0391415 A1   Dec. 17, 2020

(30) Foreign Application Priority Data
Dec. 28, 2017   (IT) ..................... 102017000150342

(51) Int. Cl.
*B29C 33/72*   (2006.01)
*B08B 7/02*   (2006.01)
(Continued)

(52) U.S. Cl.
CPC .............. *B29C 33/72* (2013.01); *B08B 7/028* (2013.01); *B29D 30/02* (2013.01); *B29D 30/0662* (2013.01); *B29D 2030/0663* (2013.01)

(58) Field of Classification Search
CPC ........... B08B 7/028; B08B 3/12; B29C 33/72; B29D 2030/0663; B29D 30/02; B29D 30/0662
See application file for complete search history.

(56) References Cited

U.S. PATENT DOCUMENTS 4,892,992 A  *  1/1990  Akeel ................ B23K 26/0884
                                                     219/121.84
5,402,364 A  *  3/1995  Kitoh ................... G01B 11/022
                                                        702/167
(Continued)

FOREIGN PATENT DOCUMENTS

CN       101517766 A      8/2009
CN       206264223 U      6/2017
(Continued)

OTHER PUBLICATIONS

JPH04-86222A Abstract (Year: 1992).*
(Continued)

*Primary Examiner* — Douglas Lee
(74) *Attorney, Agent, or Firm* — SHUTTLEWORTH & INGERSOLL, PLC; Timothy J. Klima

(57) ABSTRACT

An automatic plant for cleaning moulds for tyres, wherein the moulds are constituted of sectors and cheeks, includes an apparatus for internal cleaning of sectors and cheeks and an apparatus for external cleaning of sectors and cheeks. The apparatus for internal cleaning of sectors and cheeks comprises fixing means for sectors and cheeks in a stable treatment position, a generating device for generating ultrasonic vibrations, transmitting means for transmitting the vibrations from the device to the sector or cheek treated, in (Continued)

such a way as to carry out cleaning of sectors or cheeks by subjecting them to vibrations.

10 Claims, 4 Drawing Sheets

(51) Int. Cl.
    *B29D 30/02*    (2006.01)
    *B29D 30/06*    (2006.01)

(56) References Cited

U.S. PATENT DOCUMENTS

| | | | |
|---|---|---|---|
| 2011/0298157 A1 | 12/2011 | Vossen | |
| 2016/0266379 A1* | 9/2016 | Li | G02B 27/0006 |
| 2017/0182722 A1* | 6/2017 | Matsumura | B23K 26/36 |
| 2018/0329205 A1* | 11/2018 | Cohen | G01M 11/0278 |
| 2019/0001380 A1* | 1/2019 | Amaiwa | B29C 33/02 |

FOREIGN PATENT DOCUMENTS

| | | |
|---|---|---|
| CN | 206359781 U | 7/2017 |
| JP | H0486222 A * | 3/1992 |
| JP | 2015214076 A | 12/2015 |
| KR | 100940876 B1 | 2/2010 |
| WO | 2016163960 A1 | 10/2016 |
| WO | WO-2016163960 A1 * | 10/2016 |
| WO | 2016175711 A2 | 11/2016 |

OTHER PUBLICATIONS

JPH04-86222A machine translation (Year: 1992).*
Indian Examination Report dated May 13, 2022 from counterpart Indian Patent Application No. 202017025407.
Eurasian Office Action dated Feb. 15, 2021 from counterpart Eurasian Patent Application No. 202091361.
"Moulds Cleaning" Cleaning your Moulds is now easy with Novatec Ultrasonic Systems, Mar. 2, 2012 (Mar. 2, 2012), pp. 1-10, XP055207514.
International Search Report dated Apr. 25, 2019 from counterpart PCT App No. PCT/IB2018/001471.
Chinese Office Action dated Jul. 2, 2021 from counterpart Chinese Patent Application No. 201880083831.6.
Brazilian Search Report dated Dec. 24, 2018 from counterpart Brazilian App BR112020011977-6.
Notice of Rejection dated Oct. 17, 2022 from counterpart JP Application No. 2020-536783.
Office Action dated Feb. 2, 2023 from counterpart JP Application No. 2020-536783.

* cited by examiner

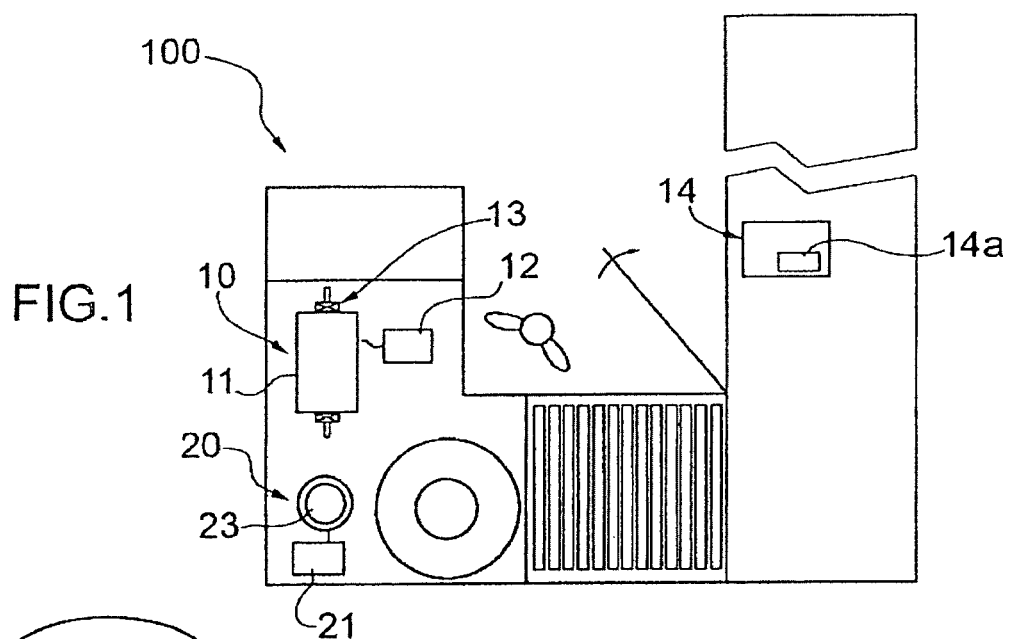
FIG. 1
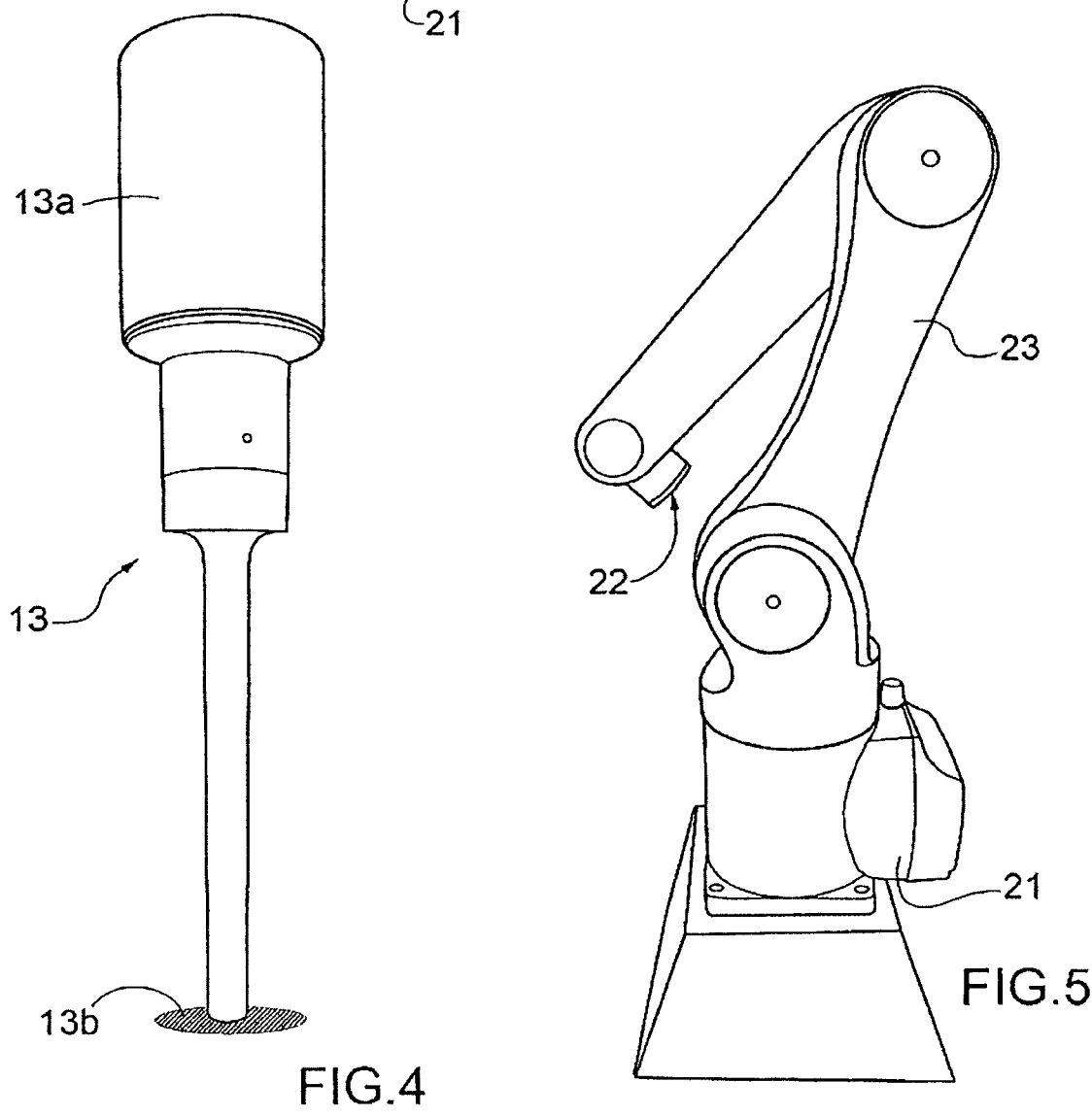
FIG. 4
FIG. 5

AUTOMATIC PLANT FOR CLEANING MOLDS FOR TIRES

This application is the National Phase of International Application PCT/IB2018/001471 filed Dec. 24, 2018 which designated the U.S.

This application claims priority to Italian Patent Application No. 102017000150342 filed Dec. 28, 2017, which application is incorporated by reference herein.

TECHNICAL FIELD

The present invention refers to an automatic plant for cleaning moulds for tyres.

The tyres mounted nowadays on most vehicles circulating on the streets of the whole world, although different in type, dimensions, structural and constructional features, fulfil a wide range of aptitudes and performance for the most different purposes and vehicles for which they are intended. They have kept a classic structural design but make use of the great technological and project evolution occurred over the years, as well as of materials increasingly conceived for the specific use and therefore more reliable and performing.

The construction of tyres currently foresees the use of specific moulds, generally made of aluminium alloys or steel or of a mixed material with aluminium and steel, into which tailored elements named "GREEN TYRE" are positioned, including the carcass, the belts, the sidewalls and the tread of the tyres; essentially, the latter perform the function of resisting to the load forces and of holding the inflation pressure of the tyre.

The Green Tyre is then positioned inside a press. Inside the press are installed some devices that contain the mould, divided into sectors and cheeks. After a series of vulcanization cycles, the mould must be cleaned of the vulcanization residues left by the tyres; therefore, the mould is dismantled into its components and brought to the cleaning treatment to allow the next reuse. During the cleaning phase, an accurate maintenance and cleaning action is required, consisting in the removal of the vulcanized rubber residues and adhesions that can remain in the small cavities of the shaped surfaces of the mould which give shape to the tread. Moreover it is essential to free the air vent valves, named "spring vents", that are blocked by the dirt of vulcanized rubber accumulated on the needle's head and by the fumes that penetrate inside the valve and that by accumulating, block subsequently the spring located inside the same valve. Not removing such slivers causes defects and imperfections on the printed surface of the tyre, that are also capable of generating problems like a not perfect grip on the rim, the non-readability of the alphanumeric characters required by law, little weakening and alterations of the characteristics of mechanical resistance and design, aesthetic defects.

BACKGROUND ART

According to the known technology, this removal is still carried out by manual means, consisting of mechanical tools like for example thin drill tips or devices, likewise manually operated, that project jets of granular materials like sand, sand-blasting, dry ice.

More modern automatic machineries are also available, which use jets of various similar substances, located inside casings or in hermetically sealed spaces; they are even able to orient themselves automatically in all directions required to clean completely the parts of the mould. The most common technology is the cryogenic one that uses dry ice.

Other commonly used systems are spray, immersion or ultrasonic chemical washing.

All the above mentioned cleaning systems have three main disadvantages: firstly, they have a significant environmental impact since chemical technologies involve the disposal of dangerous waste liquids; the use of granular materials entails likewise the disposal of waste sand, while the use of dry ice is expensive and produces a very high noise during the process.

Moreover they imply high costs due to the purchase of sand and chemicals for the washing, the disposal of liquid and/or solid waste, the maintenance of plants; lastly they may cause wearing and corrosion on the parts (sectors and cheeks) of the moulds and consequently possible damages to the printing metallic surfaces and defects on the tyres produced.

Furthermore, considering the high number of "spring vents" valves in each sector, in the order of hundreds, the control procedure takes a very long time to the operator to check the condition of each valve.

DISCLOSURE OF THE INVENTION

Purpose of the present invention is therefore to reduce the limits and to remove the above mentioned inconveniences.

The invention, as characterized by the claims, achieves the purpose by means of an automatic plant that, through a flexible programming for each kind of mould, defines the optimal internal and external cleaning for the reuse, without causing wearing and defects that may compromise the future functionality.

The main benefit obtained through the present invention is essentially to keep the quality of the tyres produced by the moulds treated in the plant unchanged.

An additional benefit lies in the fact that the automation and setting of the procedure allow to reduce the operating personnel and the processing time, producing important savings in terms of operating costs.

Another benefit of the invention is that it allows a less dangerous procedure compared to the traditional procedures used in the industry, with lower environmental impact and safer working conditions for the employees. In fact, the invention has a very low environmental impact since the waste consists of the fumes produced by the laser beam, which are then sucked and caught by the filters located inside the suction system. Other waste is generated during the step of ultra vibration that separates tiny solid fragments from the inside of the ventilation ducts and from the vent valves.

Another benefit of the invention is to clean the surface of the mould with a laser technology and at the same time to free all the ventilation valves and the relevant ducts through an ultra vibration system, in a single step.

Finally, the check of the condition of each valve is automated and allows to identify immediately the valves on which the operator intervention may be necessary.

BRIEF DESCRIPTION OF DRAWINGS

Other benefits and characteristics of the invention will be more evident in the following detailed description, which represents a non-limiting embodiment of the invention, wherein:

FIG. 1 illustrates a diagram of the invention;

FIG. 4 illustrates a detail of the apparatus of FIG. 2;

FIG. 5 illustrates the anthropomorphic robot devoted to the external cleaning of the moulds;

DETAILED DESCRIPTION OF PREFERRED EMBODIMENT OF THE INVENTION

Figure 2:
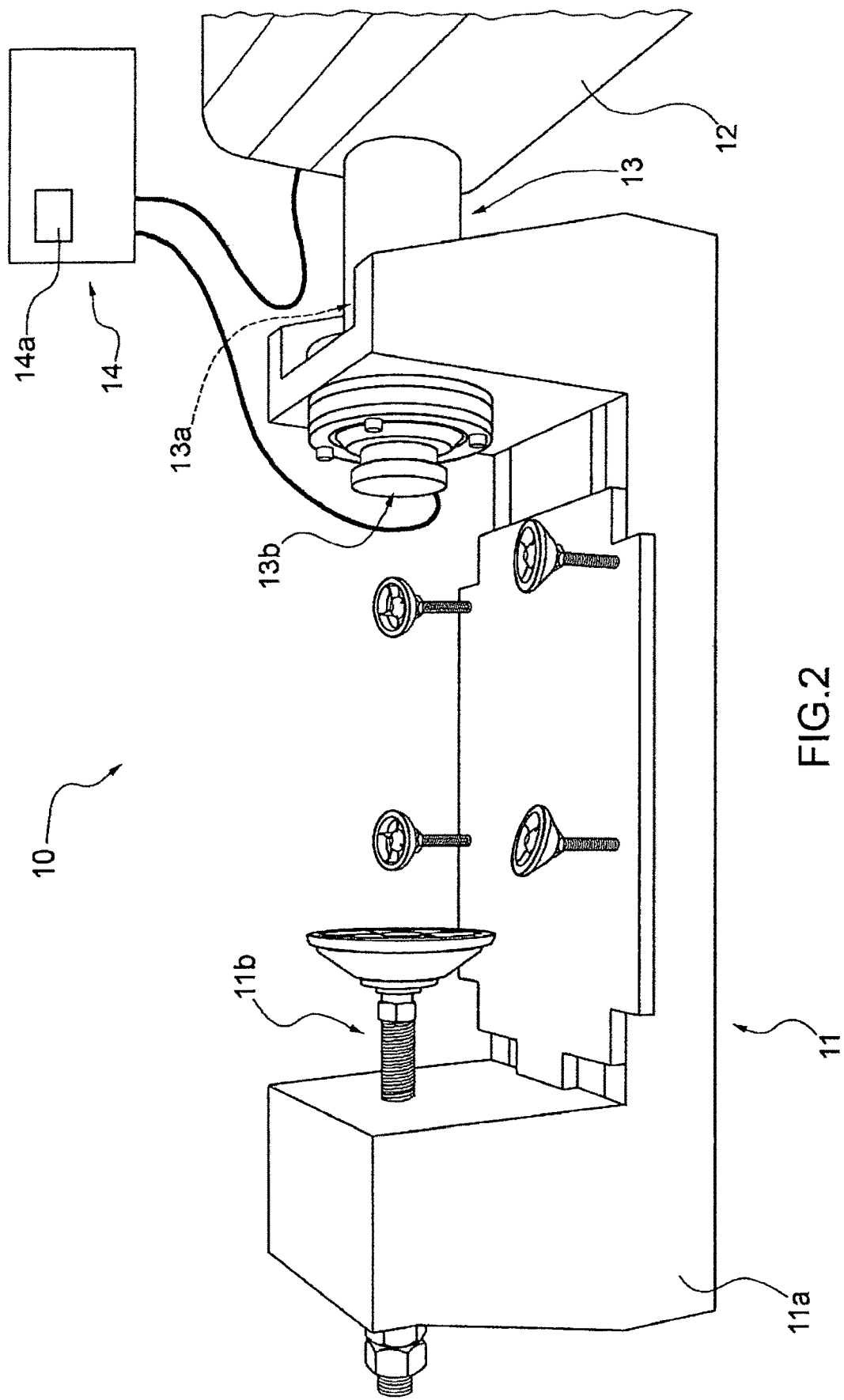
FIG. 2 illustrates the apparatus for internal cleaning of the moulds.
Figure 3:
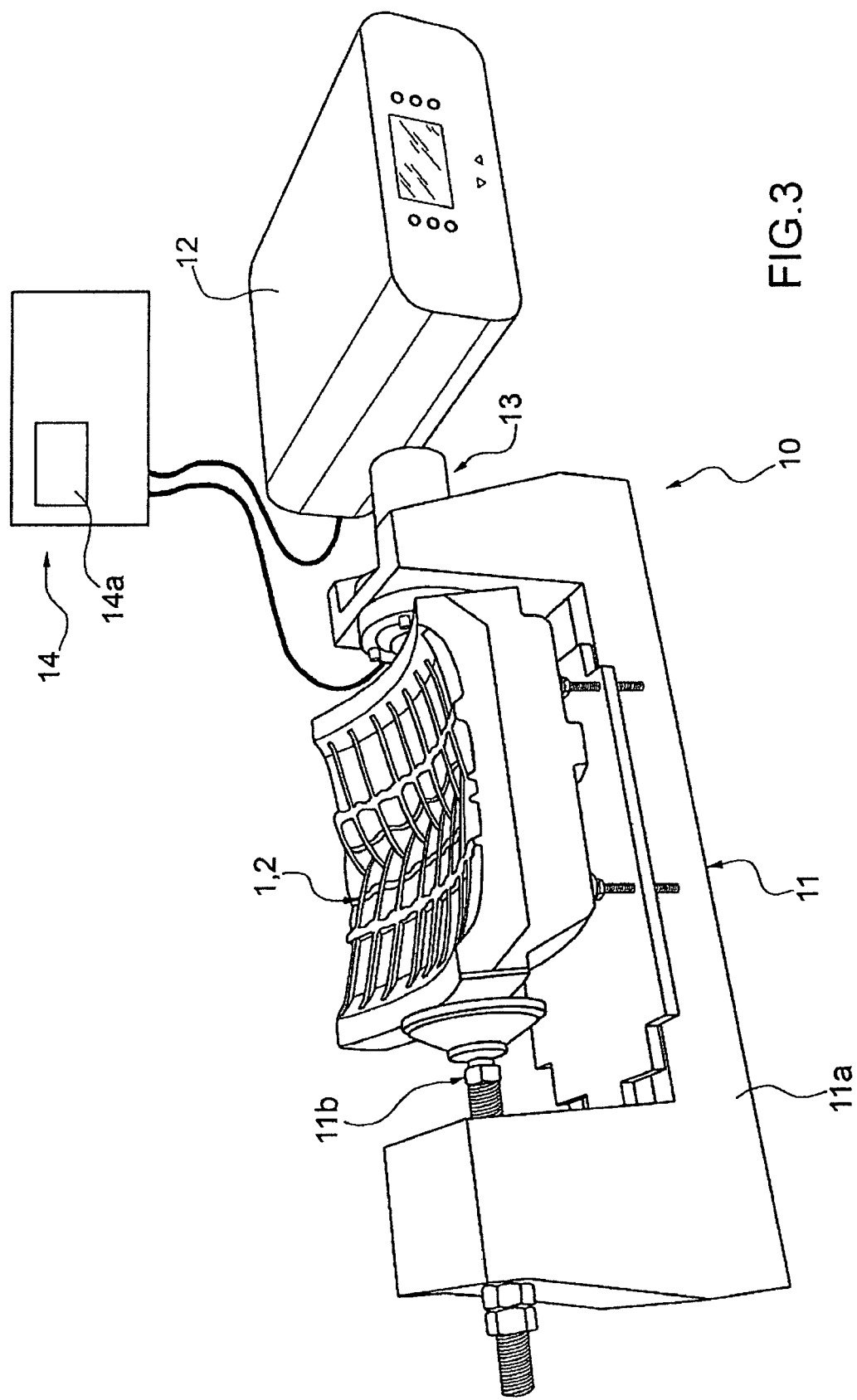
FIG. 3 illustrates the apparatus of FIG. 2 in a operating condition.
Figure 6:
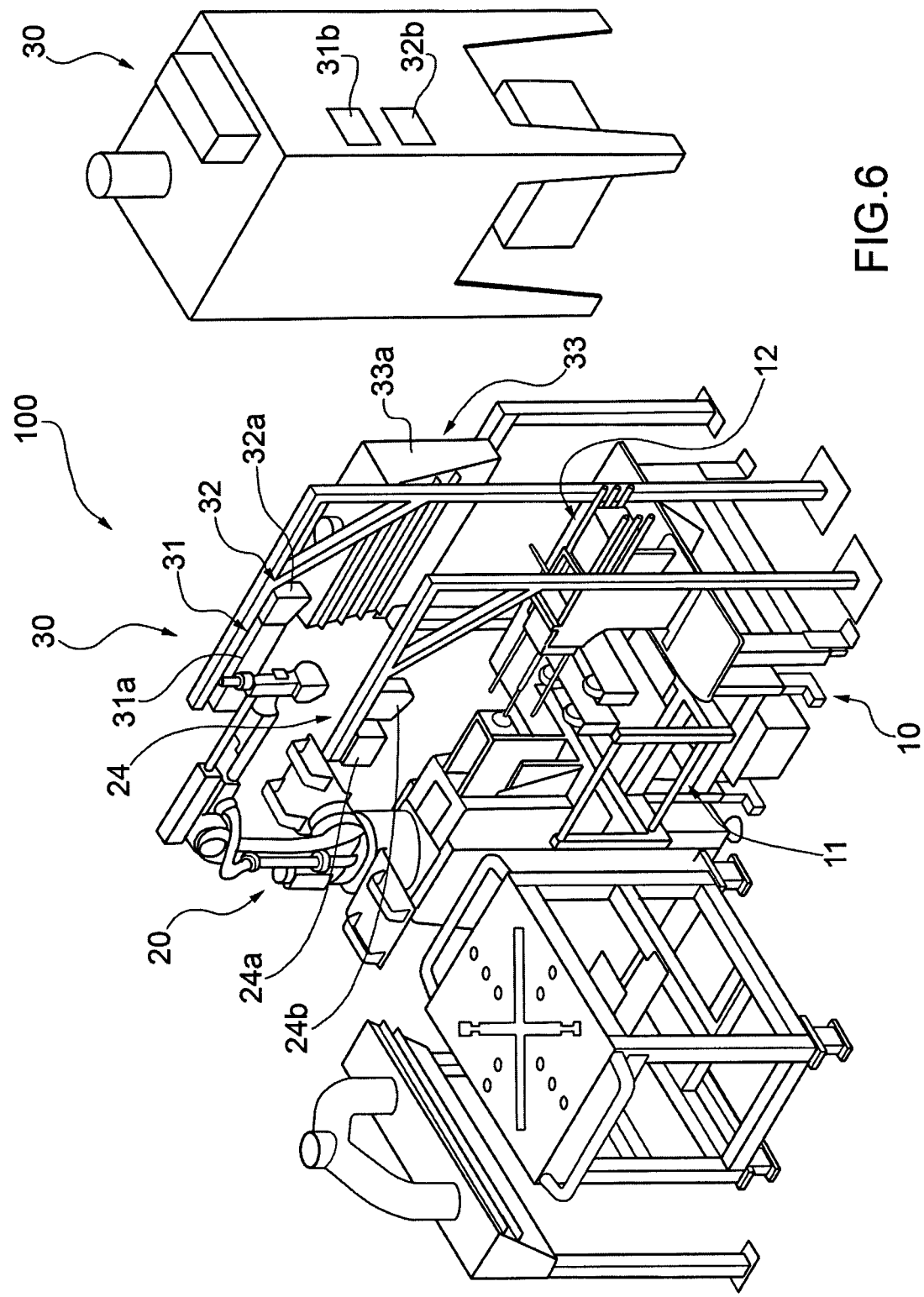
FIG. 6 illustrates the invention according to a top-down overview in perspective.

As shown in the figures, the invention concerns an automatic plant for cleaning moulds for tyres, wherein the moulds are constituted of sectors (1) and cheeks (2). The automatic plant (100) is equipped with an apparatus (10) for the internal cleaning of sectors (1) and cheeks (2) and an apparatus (20) for the external cleaning of sectors (1) and cheeks (2).

The apparatus (10) for the internal cleaning of sectors (1) and cheeks (2) comprises fixing means (11) for sectors (1) and cheeks (2) in a stable treatment position, a generating device (12) for generating ultrasonic vibrations (that is to say vibrations with frequencies ranging between 20 KHz and 2 MHz), transmitting means (13) for transmitting the vibrations from the device (12) to the sector (1) or cheek (2) treated, in such a way as to carry out cleaning of the sectors (1) or cheeks (2) by subjecting them to ultrasonic vibrations.

In a preferred solution, that turns out to be particularly effective, the apparatus (10) comprises identifying means (14) for identifying the resonant frequency of the sector (1) or cheek (2) treated, in such a way that each sector (1) or cheek (2) treated is subject to ultrasonic vibrations with frequency equal to the resonant frequency of the sector (1) or cheek (2) treated.

The fixing means (11) comprise a supporting frame (11a) and an adjustable clamp (11b), that is suitable for holding the sector (1) or cheek (2) to be treated in contact with the vibration transmitting means (13); the identifying means (14) for identifying the resonant frequency of the sector (1) or cheek (2) treated comprise a dedicated software (14a) able to select the resonant frequency amongst those initially emitted by the generating device (12) for generating ultrasonic vibrations in approximately two seconds; the vibration transmitting means (13) comprise a sonotrode (13a) incorporated in the fixing means (11), in such a way that a portion of surface (13b) of the sonotrode (13a) is in contact with the sector (1) or cheek (2) to be treated. It would be understood that at least one processor will be inherently included in the machine to implement the software disclosed herein.

When, at the beginning of the treatment, the device (12) starts generating ultrasonic vibrations, the software (14a) identifies the resonant frequency of the sector (1) or cheek (2) treated, than set the device (12) to emit vibrations on that single frequency: with this apparatus (10), in particular, it is possible to clean by means of said resonant ultrasonic vibrations the ventilation valves and the relevant ducts of sectors (1) and cheeks (2).

Since the sonotrode (13a) is subject to wear, the software (14a) either calibrates and/or corrects the calibration of the device (12) so that the sectors (1) and cheeks (2) treated keep receiving vibrations to their resonant frequency and signals the need to replace the sonotrode (13a) itself to continue to ensure an effective functioning of the apparatus (10) for the internal cleaning of sectors (1) and cheeks (2).

The apparatus (10) for the internal cleaning includes also a checking device (30) for the cleanliness of the ventilation valves: said checking device (30) consists of tools for mapping (31) the position of the ventilation valves, tools for identifying (32) the blocked ventilation valves, tools for displaying (33) the position of the blocked ventilation valves.

In the solution here described and illustrated, the tools for mapping (31) comprise a range of cameras (31a), designed to take up to thousands of photos per second for each portion of sectors (1) and cheeks (2) with different inclinations, and a second dedicated software (31b), that, from the images received by the cameras (31a), processes a two-dimensional map, recognizing the position of the ventilation valves thanks to their circular shape and assigning to each of them a pair of coordinates x, y.

The tools for identifying (32) the blocked ventilation valves may be implemented in different ways: in the solution here described, they includes a pointing system (32a) equipped with a laser with a mirror galvanometer to direct a light beam towards the ventilation valves identified before by the tools for mapping (31), and a third dedicated software (32b) that, according to the light reflected from each ventilation valve at subsequent instants while the device (12) for generating vibrations is operating, determines if this is mobile or static, and therefore, if it is working correctly or if it is blocked.

A similar result can be obtained by checking if the ventilation valves protrude or not from their housings; in this case, in fact, if they are blocked they do not protrude.

The tools for displaying (33) the position of the blocked ventilation valves include a screen (33a) connected to the third software (32b) that displays the map of the ventilation valves highlighting the blocked ones.

The apparatus (20) for external cleaning of sectors (1) and cheeks (2) comprises a source (21) of laser beams, a lens (22) for conveying the laser beams towards the surface of sectors (1) and cheeks (2), and an anthropomorphic robot (23), suitable for moving the lens (22) in such a way as to clean the entire surface of sectors (1) and cheeks (2). To allow the lens (22) to strike every point of the surface of the sector (1) or cheek (2) treated, the robot (23) is controlled according to six movement axes.

The automatic plant (100) is also equipped with sensors for detecting dimensions and position of the cheeks (2) and sectors (1) to be cleaned, in such a way as to direct the laser lens (22), moved by the arm of the anthropomorphic robot (23), following the geometry of the parts to be cleaned, so as to keep the lens (22) always at the same distance from the surface to be struck by the laser beam and to keep the distance of the lens (22) "focused". In a preferred embodiment, the automatic plant (100) includes a three-dimensional reconstruction system (24), equipped with tools for image acquisition (24a) and with a fourth dedicated software (24b), designed to provide the robot (23) the spatial coordinates of the sector (1) or cheek (2) to be treated. The direction of the light pulses of the lens (22) is controlled, so that each geometric point of the moulds is struck by the laser beam, including the points shielded due to difficult geometries, like for example in the blades and in the pattern of the tread.

The procedure for cleaning moulds for tyres, internally and externally, foresees a preliminary step of dismantling a mould into its components, that are cheeks (2) and sectors (1) and a final step, concluding the cleaning cycle, of recovery of the cleaned cheeks (2) and sectors (1), followed by the reassembly of the mould for a new use.

During the cleaning cycle, the procedure foresees the positioning, individually or in groups, within the cleaning station by means of laser technology, of cheeks (2) and sectors (1).

After the cleaning step with laser technology, there is the step of joining the cheeks (2) and sectors (1), separately and according to pre-defined quantities, to the fixing means (11) for the transmission of ultrasonic vibrations.

From an operational point of view, considering the particular structure of cheeks (2) and sectors (1), in most cases, on the cheeks (2) operates only the apparatus (20) for external cleaning, while on the sectors (1) operate at the same time the apparatus (10) for internal cleaning and the apparatus (20) for external cleaning.

At the end of the external (laser) and internal (ultra vibration) cleaning cycle of the parts to be treated (sectors and cheeks), these are then carried until an area of loading/unloading for the next reuse.

The invention claimed is:

1. An automatic plant for cleaning molds for tires, wherein the molds are constituted of sectors and cheeks, comprising:
   an apparatus for internal cleaning of the sectors and cheeks, comprising:
      a fixing device including a fixing surface for fixing the sectors and cheeks in a stable treatment position,
      a generating device configured for generating ultrasonic vibrations,
      a transmitting device configured for transmitting the ultrasonic vibrations from the generating device to a sector or cheek to be treated of the sectors and cheeks,
      an identification device configured for identifying a resonant frequency of the sector or cheek to be treated based on the ultrasonic vibrations transmitted to the sector or cheek to be treated,
      the generating device further configured to generate the ultrasonic vibrations at a frequency equal to the resonant frequency to subject the sector or cheek to be treated to the frequency equal to the resonant frequency via the transmitting device, thereby cleaning the sector or cheek to be treated;
   a checking device configured for checking a cleanliness of ventilation valves of the sectors and cheeks;
   wherein the checking device includes:
      a mapping tool configured for mapping positions of the ventilation valves,
      an identification tool configured for visually identifying blocked valves of the ventilation valves by at least one chosen from:
         directing a light beam towards the ventilation valve and analyzing light reflected from the ventilation valve at subsequent instants while the generating device is operating to determine whether the ventilation valve is mobile and operating properly, or static and blocked;
         visually checking an amount of protrusion of a portion of the ventilation valve protruding from a housing of the ventilation valve such that a lack of protrusion indicates a blocked ventilation valve; and
      a display tool configured for displaying positions of the blocked ventilation valves.

2. The automatic plant according to claim 1, and further comprising an apparatus for external cleaning of the sectors and cheeks, comprising:
   a source of laser beams,
   a lens for conveying the laser beams towards a surface of the sectors and cheeks, and
   an anthropomorphic robot, suitable for moving the lens to clean an entirety of the surface of the sectors and cheeks.

3. The automatic plant according to claim 2, wherein the robot is controllable according to six movement axes, to allow the lens to strike every point of the surface of the sectors and cheeks.

4. The automatic plant according to claim 2, and further comprising a three-dimensional reconstruction system of the sector or cheek to be treated, comprising an image acquisition tool and a fourth dedicated software configured to provide to the robot, spatial coordinates of the sector or cheek to be treated.

5. The automatic plant according to claim 1, wherein the fixing device includes a supporting frame and an adjustable clamp, each including a portion of the fixing surface and being suitable for holding the sector or cheek to be treated in contact with the transmitting device.

6. The automatic plant according to claim 1, wherein the identification device includes a processor and a first dedicated software configured to select the resonant frequency from among the ultrasonic vibrations transmitted to the sector or cheek to be treated, and to do so within two seconds.

7. The automatic plant according to claim 1, wherein the transmitting device comprises a sonotrode attached to the fixing device, such that a portion of a surface of the sonotrode is in contact with the sector or cheek to be treated.

8. The automatic plant according to claim 1, wherein the mapping tool comprises a plurality of cameras, configured to take images for each portion of the sectors and cheeks from different inclinations, a processor and a second dedicated software, configured to process from the images received by the cameras a two-dimensional map showing the positions of the ventilation valves.

9. The automatic plant according to claim 1, wherein the identification tool includes a pointing system configured to strike the ventilation valves with the light beam, a processor and a third dedicated software suitable to identify from the light reflected from the light beam a condition of immobility or mobility of the ventilation valves.

10. The automatic plant according to claim 9, wherein the display tool includes a display screen operatively connected to the identification tool to display a map of the blocked valves.

* * * * *